United States Patent
Shibata et al.

(10) Patent No.: US 8,744,358 B2
(45) Date of Patent: Jun. 3, 2014

(54) PORTABLE COMMUNICATION TERMINAL

(75) Inventors: Katsuhiko Shibata, Chiba (JP);
Takehiko Tahira, Kanagawa (JP)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 154 days.

(21) Appl. No.: 13/535,486

(22) Filed: Jun. 28, 2012

(65) Prior Publication Data

US 2013/0012129 A1 Jan. 10, 2013

(30) Foreign Application Priority Data

Jul. 4, 2011 (JP) ................. 2011-148153

(51) Int. Cl.
*H04B 7/00* (2006.01)
(52) U.S. Cl.
USPC ......................... 455/41.2; 455/420
(58) Field of Classification Search
CPC ........ H04W 8/00; H04W 84/18; H04W 4/008
USPC ................... 455/41.2, 39, 41.1, 420; 370/338
See application file for complete search history.

(56) References Cited

U.S. PATENT DOCUMENTS

| | | | |
|---|---|---|---|
| 7,535,881 B2 | 5/2009 | Maekawa et al. | |
| 7,965,981 B2 * | 6/2011 | Bloebaum et al. | 455/41.1 |
| 8,224,243 B2 * | 7/2012 | Takayama et al. | 455/41.1 |
| 8,311,478 B2 * | 11/2012 | Bloebaum et al. | 455/41.1 |
| 8,351,859 B2 * | 1/2013 | Nakagawa | 455/41.2 |
| 8,417,184 B2 * | 4/2013 | Takayama et al. | 455/41.1 |
| 8,515,349 B2 * | 8/2013 | Takayama | 455/41.2 |
| 8,583,038 B2 * | 11/2013 | Bloebaum et al. | 455/41.1 |
| 2006/0034315 A1 | 2/2006 | Maekawa et al. | |

FOREIGN PATENT DOCUMENTS

JP 2006-50020 2/2006

* cited by examiner

*Primary Examiner* — Sonny Trinh
(74) *Attorney, Agent, or Firm* — Katten Muchin Rosenman LLP

(57) ABSTRACT

The communication module 13 detects, in a predetermined operation mode in which the main processor 11 stops operation, another portable communication terminal existing in a range in which a communication connection is possible, determines the detected portable communication terminal as a target terminal from which target data is obtained, obtains the target data transmitted from the determined target terminal, and stores identification information for identifying the target terminal into the internal memory 13b. The main processor 11 executes processing using the obtained target data. The communication module 13 determines, while the main processor remains stopped, whether or not the identification information of the detected portable communication terminal is already stored in the internal memory 13b, and, under a condition that the identification information is determined to be stored, does not determine the detected portable communication terminal as the target terminal.

5 Claims, 3 Drawing Sheets

FIG.3

| OWN IDENTIFICATION INFORMATION | TRANSMISSION TARGET DATA |
|---|---|
| AA : AA : AA : AA : AA : AA | x x x |

| TARGET TERMINAL IDENTIFICATION INFORMATION | RECEPTION TARGET DATA |
|---|---|
| BB : BB : BB : BB : BB : BB | y y y |
| CC : CC : CC : CC : CC : CC | z z z |
| DD : DD : DD : DD : DD : DD | w w w |
| — | — |
| — | — |
| — | — |
| — | — |
| — | — |
| — | — |
| — | — |
| — | — |
| — | — |
| — | — |
| — | — |
| — | — |

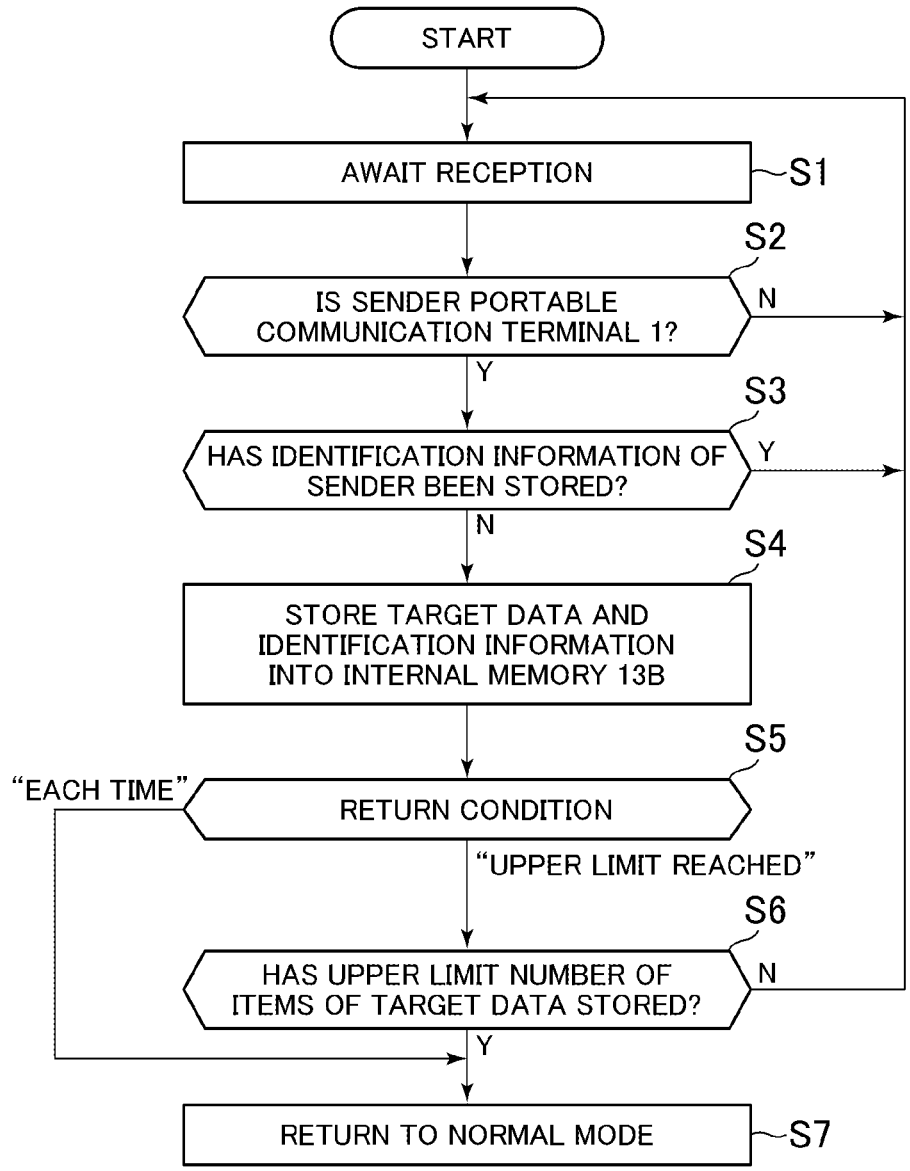

PORTABLE COMMUNICATION TERMINAL

TECHNICAL FIELD

The present invention relates to a portable communication terminal for obtaining information from other portable communication terminals via wireless communication, and a method for controlling the portable communication terminal.

BACKGROUND ART

There have been available portable communication terminals, such as portable game devices or smartphones, which users can carry with them. These portable communication terminals can exchange information with other portable communication terminals existing in their surrounding space via wireless communication, such as wireless LAN based on the IEEE802 or Bluetooth standard (see e. g., JP2006-50020A). In particular, regarding the portable game devices or the like, there is a case where such a portable communication terminal includes functions for detecting other portable communication terminals that can communicate with the portable communication terminal itself without the need for the user to specify the communication partner each time, and automatically communicates with the detected portable communication terminal to exchange previously prepared information.

SUMMARY OF THE INVENTION

With the functions mentioned above, the portable communication terminal can obtain information from other unspecified portable communication terminals without a particular instruction from the user. However, according to such functions, the portable communication terminal automatically communicates with another portable communication terminal without an instruction from the user, and thus it may cause unnecessary operations for the user, such as establishing the communication connections with the same communication partner again and again. Such unnecessary operations causes power consumption and are not desirable.

One or more embodiments of the present invention have been conceived in view of the above, and an object thereof is to provide a portable communication terminal capable of reducing power consumption while exchanging data with other portable communication terminals, and a method for controlling the portable communication terminal.

According to an embodiment of the present invention, there is provided a portable communication terminal including a main processor and a communication module having an internal memory. The communication module includes a target terminal determining unit for detecting, in a predetermined operation mode in which the main processor stops operation, another portable communication terminal existing in a range in which a communication connection is possible, and determining the detected portable communication terminal as a target terminal from which target data is obtained, and a target data obtaining unit for obtaining the target data transmitted from the determined target terminal. The main processor includes a processing executing unit for executing processing using the obtained target data. When obtaining the target data, the target data obtaining unit stores identification information for identifying the determined target terminal into the internal memory. While the main processor remains stopped, the target terminal determining unit determines whether or not the identification information of the detected portable communication terminal is already stored in the internal memory, and, under a condition that the identification information is determined to be stored, does not determine the detected portable communication terminal as the target terminal.

Further, according to the embodiment of the present invention, there is provided a method for controlling a portable communication terminal which includes a main processor and a communication module having an internal memory. The method includes the steps of detecting, by the communication module, another portable communication terminal existing in a range in which a communication connection is possible in a predetermined operation mode in which the main processor stops operation, determining, by the communication module, the detected portable communication terminal as a target terminal from which target data is obtained, obtaining, by the communication module, the target data transmitted from the determined target terminal, and executing, by the main processor, processing using the obtained target data. In the step of obtaining the target data, the communication module stores identification information for identifying the determined target terminal into the internal memory. In the step of determining the target terminal, while the main processor remains stopped, the communication module determines whether or not the identification information of the detected portable communication terminal is already stored in the internal memory, and, under a condition that the identification information is determined to be stored, does not determine the detected portable communication terminal as the target terminal.

BRIEF DESCRIPTION OF THE DRAWINGS

In the accompanying drawings:

FIG. 3 is a diagram illustrating an example of data stored in an internal memory; and FIG. 4 is a flow chart illustrating an example of processing executed by a communication processor.

DETAILED DESCRIPTION OF THE INVENTION

According to an embodiment of the present invention, there is provided a portable communication terminal including a main processor and a communication module having an internal memory. The communication module includes a target terminal determining unit for detecting, in a predetermined operation mode in which the main processor stops operation, another portable communication terminal existing in a range in which a communication connection is possible, and determining the detected portable communication terminal as a target terminal from which target data is obtained, and a target data obtaining unit for obtaining the target data transmitted from the determined target terminal. The main processor includes a processing executing unit for executing processing using the obtained target data. When obtaining the target data, the target data obtaining unit stores identification information for identifying the determined target terminal into the internal memory. While the main processor remains stopped, the target terminal determining unit determines whether or not the identification information of the detected portable communication terminal is already stored in the internal memory, and, under a condition that the identification information is determined to be stored, does not determine the detected portable communication terminal as the target terminal.

In the portable communication terminal, the target data obtaining unit may obtain, while the main processor remains stopped, the target data transmitted from the target terminal and stores the obtained target data into the internal memory. The processing executing unit may execute, after the predetermined operation mode ends, the processing using the target data stored in the internal memory.

Further, in the portable communication terminal, the target terminal determining unit may detect a portable communication terminal existing in the range in which the communication connection is possible by receiving a notification signal transmitted from the portable communication terminal. The target data obtaining unit may obtain data contained in a predetermined portion of the received notification signal as the target data.

Further, in the portable communication terminal, the target data obtaining unit may instruct an end of the predetermined operation mode every time a predetermined number of items of the target data are obtained and stored in the internal memory. The processing executing unit may execute the processing using the predetermined number of items of the target data that have been stored in the internal memory during the predetermined operation mode.

An embodiment of the present invention will be described below in detail with reference to the accompanying drawings.

Figure 1:
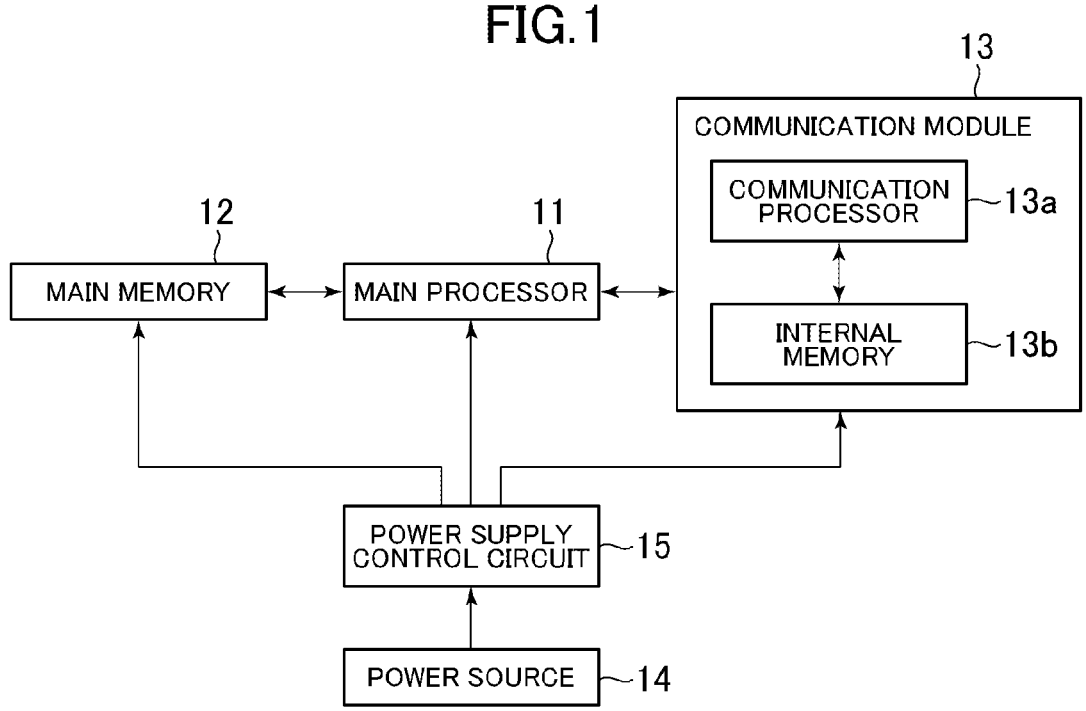
FIG. 1 is a diagram illustrating a hardware configuration of a portable communication terminal according to an embodiment of the present invention.

FIG. 1 is a diagram illustrating a hardware configuration of a portable communication terminal 1 according to the embodiment of the present invention. The portable communication terminal 1 is a portable information processing device, such as a portable game device. As shown in FIG. 1, the portable communication terminal 1 includes a main processor 11, a main memory 12, a communication module 13, a power source 14, and a power supply control circuit 15.

The main processor 11 executes various kinds of information processing in accordance with a program stored in the main memory 12. In particular, in this embodiment, the main processor 11 instructs the communication module 13 to operate in a standby mode. Further, using data that the communication module 13 has received from another portable communication terminal 1, the main processor 11 executes various kinds of processing.

The main memory 12 includes a memory device such as a RAM, and stores the program which the main processor 11 executes. The main memory 12 also operates as a working memory for the main processor 11.

The communication module 13 is a microprocessor including a communication processor 13a and an internal memory 13b as shown in FIG. 1. The communication module 13 performs wireless data communication with other communication devices in accordance with instructions from the main processor 11. This wireless data communication may be performed in various manners, such as wireless LAN based on the IEEE802.11 or Bluetooth standard.

The power source 14 is, for example, a rechargeable battery to supply necessary power for the operation of the portable communication terminal 1. The power supply control circuit 15 transforms the power supplied by the power source 14 as necessary, and supplies the power to each section of the portable communication terminal 1.

In this embodiment, the portable communication terminal 1 operates in one of a plurality of operation modes, including a normal mode and a standby mode. The normal mode is an operation mode for allowing the main processor 11 to be supplied with power and execute various information processing. On the other hand, the standby mode is an operation mode for allowing the communication module 13 to communicate independently from the main processor 11. During the operation in the standby mode, power supply to the main processor 11 is suspended. That is, in the standby mode, the main processor 11 stops operation, and the communication module 13 autonomously detects a communication partner. In the standby mode, power supply to the main processor 11 is suspended and the main memory 12 only maintains data that is stored at the time when the mode shifts to the standby mode, and data stored in the main memory 12 is not updated. Accordingly, in the standby mode, the portable communication terminal 1 operates using significantly less power than in the normal mode.

The portable communication terminal 1 exchanges data with another portable communication terminal 1 that is detected by the communication module 13 in the standby mode. In the following, data that is exchanged among the portable communication terminals 1 is referred to as target data. For example, in a case where the portable communication terminal 1 executes a game program, target data is data that is generated by the game program, and may be data of an item or character of the game.

Figure 2:
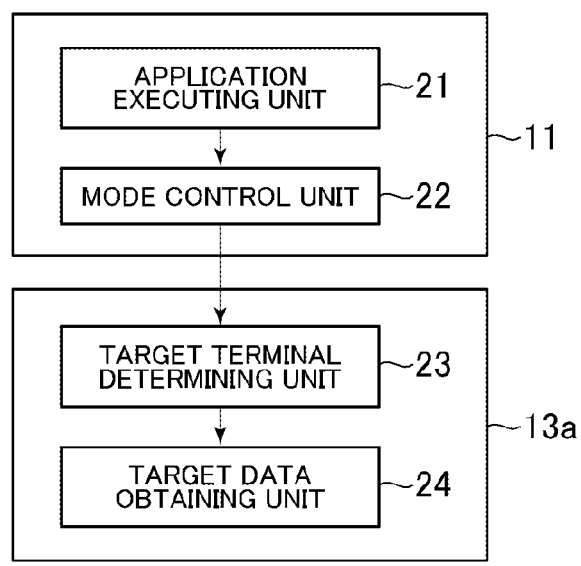
FIG. 2 is a functional block diagram illustrating functions of the portable communication terminal according to an embodiment of the present invention.

An embodiment of the functions implemented by the portable communication terminal 1 will be described below in detail with reference to the functional block diagram of FIG. 2. As shown in FIG. 2, the portable communication terminal 1 functionally includes an application executing unit 21, a mode control unit 22, a target terminal determining unit 23, and a target data obtaining unit 24. Among these, the application executing unit 21 and the mode control unit 22 are implemented by the main processor 11 executing the program stored in the main memory 12. The target terminal determining unit 23 and the target data obtaining unit 24 are implemented by the communication processor 13a executing the embedded firmware.

The application executing unit 21 executes the processing of the application program stored in the main memory 12. For example, if this application program is a game program, the application executing unit 21 executes the game processing. Further, the application executing unit 21 generates target data (transmission target data) to be transmitted to another portable communication terminal 1, and executes the processing using target data (reception target data) obtained by the target data obtaining unit 24, which will be described later, from another portable communication terminal 1. For example, the application executing unit 21 presents content of the reception target data to a user by, for example, displaying on a display (not shown).

The mode control unit 22 starts the standby mode upon receiving, for example, an instruction from the application executing unit 21 or an operation instruction from the user. Specifically, the mode control unit 22 instructs the communication module 13 to start the standby mode, and also instructs the power supply control circuit 15 to stop power supply to the main processor 11 itself. With this, the main processor 11 stops operation. During the operation in the standby mode, the target terminal determining unit 23 detects another portable communication terminal 1 existing within a communication range, and determines the detected portable communication terminal 1 as a target terminal. Here, the target terminal refers to the portable communication terminal 1 that transmits the target data that is to be obtained by the target data obtaining unit 24, which will be described later.

In particular, upon receiving an instruction from the mode control unit 22 to start the standby mode, the target terminal determining unit 23 starts the standby state for awaiting a notification signal (e. g., beacon signal) transmitted from another portable communication terminal 1. Here, the notification signal is a communication packet sent from a communication device to notify another communication device of its own information prior to establishing a communication connection with another communication device, and typically, not sent to a specific communication device but to non-specific communication devices. When receiving the notification signal in the standby state, the target terminal determining unit 23 determines whether or not the communication device that has transmitted the notification signal is a portable communication terminal 1 that satisfies predetermined conditions. If the communication device is determined as the portable communication terminal 1 that satisfies the predetermined conditions, such portable communication terminal 1 is determined as the target terminal. The predetermined conditions will be described later in detail.

The target terminal determining unit 23 may alternate between the standby state for awaiting the notification signal transmitted from other portable communication terminals 1 and a signal transmission state for regularly transmitting the notification signal to other portable communication terminals 1. In this manner, when two portable communication terminals 1 each operating in the standby mode approach each other to within a distance at which they can communicate, one portable communication terminal 1 receives a notification signal transmitted from the other portable communication terminal 1, thereby detecting the existence of the portable communication terminal 1 that has transmitted the notification signal.

The target data obtaining unit 24 obtains the target data transmitted by the target terminal determined by the target terminal determining unit 23. In this embodiment, suppose that the target terminal transmits transmission target data included in the notification signal mentioned above. The target data obtaining unit 24 extracts the target data from the notification signal received when the target terminal determining unit 23 determines the target terminal. In this way, after the target terminal is determined, the target data obtaining unit 24 can obtain the reception target data without newly establishing a communication connection with the target terminal and receiving additional target data. In this regard, in a case where the obtained reception target data is stored in the internal memory 13b, the target data obtaining unit 24 can finish obtaining the reception target data while remaining in the standby mode. In other words, when obtaining the reception target data, the communication module 13 can independently obtain and hold the reception target data without operating the main processor 11 and accessing the main memory 12.

In this case, the target terminal embeds the transmission target data in a predetermined portion (field) of the notification signal. This field may be in a range from a predetermined start bit to a predetermined end bit, counted from the beginning of the notification signal. Preferably, this field is a free space not used for original functions of the notification signal (functions to notify other portable communication terminals 1 of its own information). Specific examples include that, when the communication module 13 transmits the notification signal based on the IEEE802.11 standard, the target terminal stores the transmission target data in the Vendor Specific field, which can be used for storing vendor-specific information. With use of such a field, it is possible to transmit, using the notification signal, the target data to be used for substantial processing of the application program. When using the notification signal for transmitting the target data in this way, the target data needs to be an amount that will fit into the field. In a case where data in an amount exceeding the amount that will fit into the field is desired to be sent and received, the target data needs to be obtained in the normal mode, as described later.

Further, when obtaining the target data, the target data obtaining unit 24 stores, in the internal memory 13b, identification information for identifying the target terminal that has sent the target data. This identification information is information for uniquely identifying respective portable communication terminals 1, such as a MAC address of target terminal, and may be information that is received from a target terminal when the target terminal determining unit 23 determines the target terminal. When the reception target data obtained by the target data obtaining unit 24 is stored in the internal memory 13b as described above, the target data obtaining unit 24 stores, in association with the reception target data, the identification information of the target terminal that has transmitted the reception target data. FIG. 3 shows an example of content of data stored in the internal memory 13b in this case. In the example of FIG. 3, the internal memory 13b stores the reception target data that the target data obtaining unit 24 obtains from the target terminal and the identification information of the target terminal that has transmitted the reception target data. In addition, the internal memory 13b stores the transmission target data to be transmitted to other portable communication terminals 1 and its own identification information. The transmission target data and own identification information of the portable communication terminal 1 are used when the portable communication terminal 1 transmits the target data to another portable communication terminal 1. In FIG. 3, the internal memory 13b is capable of storing 15 items of reception target data in total. In this example, 3 items of the reception target data are actually stored.

The identification information which the target data obtaining unit 24 stores in the internal memory 13b is used in the above mentioned processing by the target terminal determining unit 23 for determining the target terminal. In the following, the conditions for determining a target terminal by the determining unit 23 will be explained. The target terminal determining unit 23 determines whether or not the communication device that has transmitted the notification signal is a portable communication terminal 1 of the same type as itself. For example, when the communication module 13 transmits a notification signal according to the wireless LAN standard, such notification signal includes information on SSID (Service Set Identifier). As such, if the portable communication terminals 1 of the same type always use the same SSID, the target terminal determining unit 23 can find out whether or not the communication device which has transmitted the notification signal is a portable communication terminal 1 of the same type as itself by referring to the SSID included in the received notification signal.

If the communication device that sent the notification signal is determined as the same type as the portable communication terminal 1 that receives the notification signal, the target terminal determining unit 23 then determines whether or not identification information of the sender portable communication terminal 1 matches the identification information stored in the internal memory 13b. Here, suppose that the identification information of the portable communication terminal 1 that sent the notification information is included in this notification signal. If the matching identification information is already stored in the internal memory 13b, it can be said that the target data is already obtained from the portable communication terminal 1 that sent the notification signal. Thus, in this case, the target terminal determining unit 23 does not determine the portable communication terminal 1 that sent the notification signal as a target terminal. In other words, the target terminal determining unit 23 determines the portable communication terminal 1 as a target terminal only when identification information of the portable communication terminal 1 is not stored in the internal memory 13b. This way, the portable communication terminal 1 can avoid repeatedly obtaining the same target data from the same communication partner.

After the standby mode ends and the normal mode begins, the application executing unit 21 executes the processing using the reception target data which has been received and stored in the internal memory 13b by the target data obtaining unit 24 in the standby mode. Here, suppose that since the number of items of reception target data that can be stored in the internal memory 13b is limited, the target data obtaining unit 24 instructs to return to the normal mode when the number of items of reception target data reaches to the predetermined upper limit number N. In response to such an instruction, the power supply control circuit 15 starts to supply power to the main processor 11. Subsequently, the application executing unit 21 of the main processor 11 executes the processing of the application program so as to read out the reception target data stored in the internal memory 13b. At this time, the application executing unit 21 may execute the processing for copying the stored reception target data from the internal memory 13b to the main memory 12. Then, the reception target data that is read out and processed is deleted from the internal memory 13b. As a result, when the standby mode starts again, the communication module 13 can obtain new target data.

The target data obtaining unit 24 may change the time for returning to the normal mode based on, for example, an instruction from the application executing unit 21. In particular, the target data obtaining unit 24 operates based on either one of the two return conditions: an "upper limit reached" condition for returning to the normal mode at the time when the upper limit N number of items of reception target data are obtained, as mentioned above, and an "each time" condition for returning to the normal mode every time one item of reception target data is obtained. The application executing unit 21 selects one of a plurality of return conditions and instructs it to the target data obtaining unit 24, thereby, depending on the characteristics of data, making it possible to collectively obtain a plurality of items of reception target data, or, every time an item of reception target data is obtained, reflect content of the obtained item of reception target data in its processing.

In the following, an example of processing executed by the communication processor 13a upon receiving the instruction to start the standby mode will be explained with reference to the flow chart of FIG. 4.

When the standby mode starts, the target terminal determining unit 23 initially awaits receipt of a notification signal (S1). Upon receiving the notification signal, the target terminal determining unit 23 then determines whether or not the notification signal is received from a portable communication terminal of the same type (S2). If the notification signal is not received from a portable communication terminal of the same type, returning to S1, the target terminal determining unit 23 awaits receipt of the next notification signal. On the other hand, when it is determined that the notification signal is received from a portable communication terminal 1 of the same type, the target terminal determining unit 23 determines whether or not identification information of the sender portable communication terminal 1 is already stored in a database within the internal memory 13b (S3). If so, returning to S1, the target terminal determining unit 23 awaits receipt of the next notification signal.

In S3, when it is determined that the identification information of the sender portable communication terminal 1 is not stored, the target data obtaining unit 24 extracts target data from the notification signal received in S1, and stores the extracted target data in the internal memory 13b together with the identification information of the sender portable communication terminal 1 (S4). Subsequently, the target data obtaining unit 24 determines which one of the "upper limit reached" and "each time" conditions is specified as a return condition to the normal mode (S5). When the "upper limit reached" is specified as the return condition, the target data obtaining unit 24 further determines whether or not the internal memory 13b stores the upper limit N number of items of reception target data (S6). If not, returning to S1, the target data obtaining unit 24 awaits receipt of a new notification signal. On the other hand, in S6, when it is determined that the upper limit N number of items of reception target data are stored, the target data obtaining unit 24 instructs to return to the normal mode (S7). Similarly, in the case where "each time" is specified as the return condition, the target data obtaining unit 24 also instructs to return to the normal mode (S7).

According to the above mentioned processing flow, while maintaining the standby mode, the communication processor 13a continues to obtain the reception target data until the return condition to the normal mode is satisfied. Further, once the target data is obtained from a portable communication terminal 1, the internal memory 13b stores identification information of such portable communication terminal 1. This approach makes it possible to avoid redundantly obtaining the target data from the same portable communication terminal 1, and as a result, the internal memory 13b with a limited capacity can store lots of target data, and the frequency of returning to the normal mode can be reduced.

The embodiment of the present invention is not limited to the abovementioned examples. For example, in the above, the communication processor 13a stores the reception target data in the internal memory 13b while maintaining the standby mode. Alternatively, the communication processor 13a may return to the normal mode at the time when obtaining the reception target data, and obtain the reception target data according to the control of the main processor 11. In such a case, when the target terminal determining unit 23 determines the target terminal, the target data obtaining unit 24 instructs to return to the normal mode, and based on the instruction, the main processor 11 starts to operate. Further, the target data obtaining unit 24 establishes a communication connection with the target terminal. To be more specific, in the case of an ad hoc mode wireless LAN, the target data obtaining unit 24 establishes a state in which mutual communication can be performed, for example, by forming an IBSS (Independent Basic Service Set) with the target terminal. In this state, the target data obtaining unit 24 receives target data from the target terminal based on the control of the main processor 11 and stores the received target data in the main memory 12. Upon completion of obtaining and storing the target data, the normal mode ends to return to the standby mode, and the main processor 11 stops operation. In this way, although it is necessary to operate the main processor 11 and access to the main memory 12 every time the target data is obtained, it is possible to obtain data having a size that is difficult to store in the internal memory 13b as the target data. In this case, too, the target data obtaining unit 24 stores, in the internal memory 13b, identification information of the target terminal from which the target data is received, and thus, when receiving a notification signal from the same portable communication terminal 1, the target terminal determining unit 23 can avoid determining such a portable communication terminal 1 as the target terminal. As a result, it is possible to prevent the main processor 11 from operating many times in order to obtain the same target data.

In the above, the target terminal determining unit 23 always determines, as the target terminal, a portable communication terminal 1 of the same type as itself. However, the target terminal determining unit 23 is not limited to the above but may determine a plurality of types of portable communication terminals as the target terminal. In such a case, for example, the target terminal determining unit 23 determines, as a target terminal, the portable communication terminal that has transmitted a notification signal including one of a plurality of predetermined SSIDs.

What is claimed is:

1. A portable communication terminal comprising:
  a main processor; and
  a communication module having an internal memory,
  wherein the communication module includes:
  a target terminal determining unit for detecting, in a predetermined operation mode in which the main processor stops operation, another portable communication terminal existing in a range in which a communication connection is possible, and determining the detected portable communication terminal as a target terminal from which target data is obtained; and
  a target data obtaining unit for obtaining the target data transmitted from the determined target terminal,
  wherein the main processor includes a processing executing unit for executing processing using the obtained target data,
  wherein, when obtaining the target data, the target data obtaining unit stores identification information for identifying the determined target terminal into the internal memory, and
  wherein, while the main processor remains stopped, the target terminal determining unit determines whether or not the identification information of the detected portable communication terminal is already stored in the internal memory, and, under a condition that the identification information is determined to be stored, does not determine the detected portable communication terminal as the target terminal.

2. The portable communication terminal according to claim 1,
  wherein the target data obtaining unit obtains, while the main processor remains stopped, the target data transmitted from the target terminal and stores the obtained target data into the internal memory, and
  wherein the processing executing unit executes, after the predetermined operation mode ends, the processing using the target data stored in the internal memory.

3. The portable communication terminal according to claim 2,
  wherein the target terminal determining unit detects a portable communication terminal existing in a range in which a communication connection is possible by receiving a notification signal transmitted from the portable communication terminal, and
  wherein the target data obtaining unit obtains data contained in a predetermined portion of the received notification signal as the target data.

4. The portable communication terminal according to claim 2,
  wherein the target data obtaining unit instructs an end of the predetermined operation mode every time a predetermined number of items of the target data are obtained and stored in the internal memory, and
  wherein the processing executing unit executes the processing using the predetermined number of items of the target data that have been stored in the internal memory during the predetermined operation mode.

5. A method for controlling a portable communication terminal which includes a main processor and a communication module having an internal memory, the method comprising the steps of:
  detecting, by the communication module, another portable communication terminal existing in a range in which a communication connection is possible in a predetermined operation mode in which the main processor stops operation;
  determining, by the communication module, the detected portable communication terminal as a target terminal from which target data is obtained;
  obtaining, by the communication module, the target data transmitted from the determined target terminal; and
  executing, by the main processor, processing using the obtained target data,
  wherein, in the step of obtaining the target data, the communication module stores identification information for identifying the determined target terminal into the internal memory, and
  wherein, in the step of determining the target terminal, while the main processor remains stopped, the communication module determines whether or not the identification information of the detected portable communication terminal is already stored in the internal memory, and, under a condition that the identification information is determined to be stored, does not determine the detected portable communication terminal as the target terminal.

* * * * *